(12) United States Patent
Kraft et al.

(10) Patent No.: US 7,149,550 B2
(45) Date of Patent: Dec. 12, 2006

(54) COMMUNICATION TERMINAL HAVING A TEXT EDITOR APPLICATION WITH A WORD COMPLETION FEATURE

(75) Inventors: Christian Kraft, Hvidovre (DK); Claus Aagaard Pedersen, Copenhagen (DK); Jens Benner, Copenhagen (DK); Lars Bohn Hansen, Holte (DK); Juha Marila, Taivassalo (FI); Panu Korhonen, Helsinki (FI)

(73) Assignee: Nokia Corporation, Espoo (FI)

( * ) Notice: Subject to any disclaimer, the term of this patent is extended or adjusted under 35 U.S.C. 154(b) by 519 days.

(21) Appl. No.: 09/993,513

(22) Filed: Nov. 27, 2001

(65) Prior Publication Data

US 2003/0104839 A1    Jun. 5, 2003

(51) Int. Cl.
*H04B 1/38* (2006.01)
(52) U.S. Cl. .................. 455/566; 704/710; 715/533
(58) Field of Classification Search .............. 455/566, 455/564, 550; 345/169, 812, 352; 707/532, 707/6; 715/533, 530, 534, 535; 704/10; 341/23, 22, 21
See application file for complete search history.

(56) References Cited

U.S. PATENT DOCUMENTS

| | | | | |
|---|---|---|---|---|
| 5,258,748 A * | 11/1993 | Jones | .......................... | 345/172 |
| 5,671,426 A * | 9/1997 | Armstrong, III | ............. | 704/10 |
| 5,786,776 A * | 7/1998 | Kisaichi et al. | ............... | 341/23 |
| 5,952,942 A * | 9/1999 | Balakrishnan et al. | ........ | 341/20 |
| 5,953,541 A * | 9/1999 | King et al. | .................... | 710/67 |
| 6,405,060 B1 * | 6/2002 | Schroeder et al. | .......... | 455/566 |
| 6,528,741 B1 * | 3/2003 | Walker | ....................... | 200/5 R |
| 6,556,841 B1 * | 4/2003 | Yu | .............................. | 715/533 |
| 6,686,902 B1 * | 2/2004 | Lee | ............................. | 345/157 |
| 2002/0054135 A1 * | 5/2002 | Noguchi et al. | ............ | 345/788 |

* cited by examiner

*Primary Examiner*—Temica Beamer
*Assistant Examiner*—Joy Contee
(74) *Attorney, Agent, or Firm*—Banner & Witcoff, Ltd.

(57) ABSTRACT

The input of words into a text string in a communication terminal is handled by recording a key stroke sequence inputted for characterising one of said words, and comparing said key strokes sequence with candidates in a word completion directory in order to find word completion candidates matching said key stroke sequence. One of said matching word completion candidates is displayed in the display for selection by the user. When the user selects a word which exceeds a first predetermined number of characters the selected word is added to the directory including a plurality of word completion candidates, if the selected word is not present there already.

41 Claims, 5 Drawing Sheets

COMMUNICATION TERMINAL HAVING A TEXT EDITOR APPLICATION WITH A WORD COMPLETION FEATURE

BACKGROUND OF THE INVENTION

The invention relates to a method and editor for improving character input into terminals, such as cellular phones or other units with multiple characters per key.

The number of required key presses can be significantly reduced by different word completion schemes. This invention uses context information to improve the accuracy of word completion. The context can be derived from other text material available in the terminal.

SUMMARY OF THE INVENTION

According to a first aspect of the invention there is provided a method of handling the input of words into a text string in a communication terminal, comprising steps of recording a key stroke sequence inputted for characterizing one of said words, comparing said key strokes sequence with candidates in a word completion directory in order to find a words completion candidates matching said key stroke sequence, displaying one of said matching words completion candidates in the display for selection by the user; and adding a word selected by the user to said directory including a plurality of word completion candidates, if the selected word exceeds a first predetermined number of characters, and if this word is not present there already.

Word completion allows a considerable increase of the overall speed when typing, especially since long words will require only a few (two to five) key-presses to type. Word completion is of course per se known, but traditionally word completion has required large and memory consuming language dictionaries to be built into the phone. This concept minimizes the memory use, since it is optimized for the actual user.

According to the preferred embodiment of the invention the content of other memories—e.g. written or received messages—in a terminal may be copied into the word completion directory, whereby this dictionary will include candidates comprising a plurality text strings each consisting of a plurality of individual words and derived from text messages stored in the communication terminal.

Preferably, the user, when the candidate consisting of a text string consisting of a plurality of individual words, selects the first candidate word in the text string by pressing a select-key for a period shorter than a predetermined period of time, and the entire text string by pressing the select-key for a period longer than a predetermined period of time.

According to the preferred embodiment of the invention, the word completion candidates in the word completion directory are searched for matches, when the number of key strokes to be interpreted exceeds a second predetermined number of key strokes. Preferably, the second predetermined number of key strokes is four. Preferably, the first predetermined number of key strokes is two.

When finding matches in text strings containing several individual words, the plurality of text strings each consisting of a plurality of words is searched when a third number of key strokes has been entered for the entire text string. Preferably, the third predetermined number of key strokes is four.

According to the invention the word completion directory contains words being entered by the user by means of a text editor during a plurality of different sessions, such as in previously terminated message writing sessions. The invention works in predictive editors as well as in non-ambiguous editors.

According to a second aspect of the invention, there is provided a character entry application for use in a communication terminal for entering a text string for use in text applications. The character entry application comprises text entry keys for entering a key stroke sequence inputted for characterizing a character string, a word completion directory, means for recording the inputted key stroke sequence, means for comparing the inputted key strokes sequence with candidates in the word completion directory in order to find words completion candidates matching the inputted key stroke sequence, a display for displaying one of said matching words completion candidates, means for selecting the displayed one of said matching words completion candidates, and means for adding a selected word to said directory including a plurality of word completion candidates, if the selected word exceeds a first predetermined number of characters, and if this word is not present there already.

According to a third aspect of the invention there is provided a communication terminal having character entry application according to the second aspect of the invention for entering a text string for use in text applications.

BRIEF DESCRIPTION OF THE DRAWING

For a better understanding of the present invention and to understand how the same may be brought into effect reference will now be made, by way of example only, to accompanying drawings, in which.

DETAILED DESCRIPTION OF THE INVENTION

Figure 1:
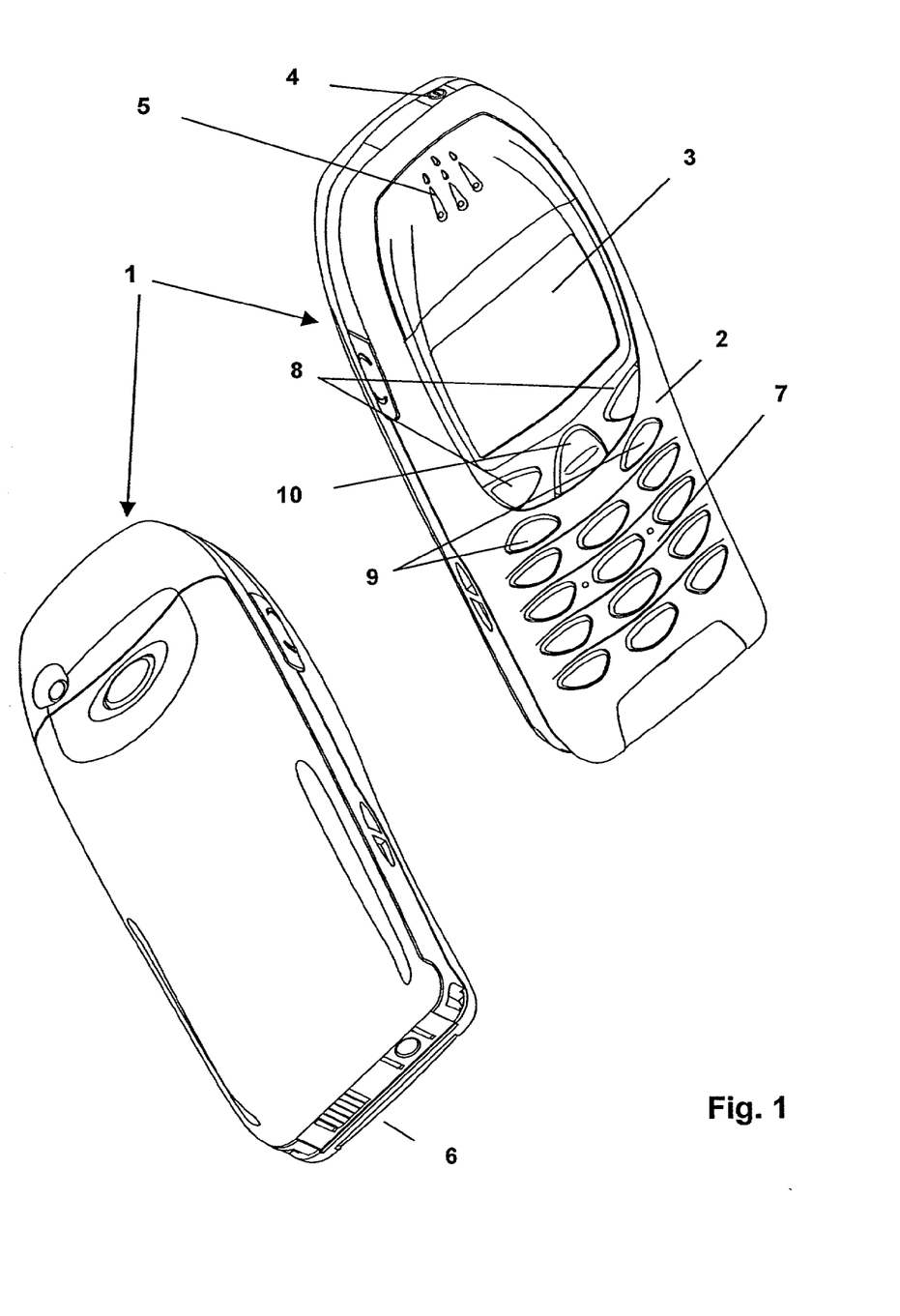
FIG. 1 schematically illustrates a preferred embodiment of a hand portable phone according to the invention.

FIG. 1 shows a preferred embodiment of a terminal according to the invention, such as a cellular phone 1, which comprises a user interface having a keypad 2, a display 3, an on/off button 4, a speaker 5 (only openings are shown), and a microphone 6 (only openings are shown). The phone 1 according to the preferred embodiment is adapted for communication preferable via a cellular network e.g. a GSM network.

According to the preferred embodiment the keypad 2 has a first group 7 of keys as alphanumeric keys, two soft-keys 8, and a navigation key 10 for moving a cursor. Furthermore the keypad includes two call-handling keys 9 for initiating and terminating calls. The present functionality of the soft-keys 8 is shown in a separate field in the bottom of the display 3 just above the soft-keys 8. This key layout is characteristic of e.g. the phone launched by the applicant under the trade name Nokia 6210™.

Figure 2:
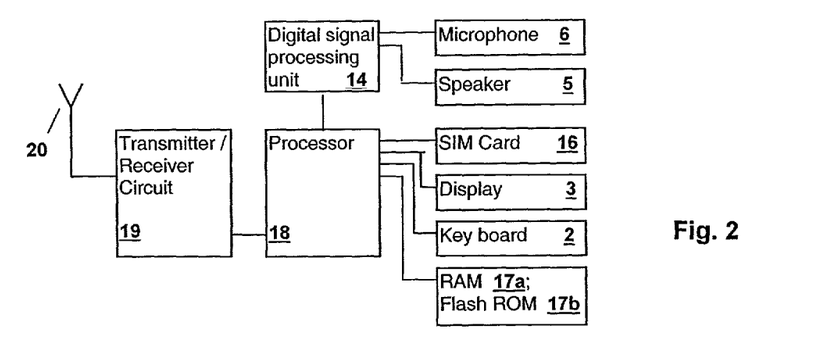
FIG. 2 schematically shows the essential parts of a telephone for communication with e.g. a cellular network.

FIG. 2 schematically shows the most important parts of a preferred embodiment of the phone, said parts being essential to the understanding of the invention. A processor 18, which supports the GSM terminal software, also controls the communication with the network via the transmitter/receiver circuit 19 and an antenna 20.

The microphone 6 transforms the user's speech into analogue signals; the signals formed thereby are A/D converted in an A/D converter (not shown) before the speech is encoded in an audio part 14. The encoded speech signal is transferred to the processor 18. The processor 18 also forms the interface to a RAM memory 17a and a Flash ROM memory 17b, a SIM card 16, the display 3 and the keypad 2 (as well as data, power supply, etc.). The audio part 14 speech-decodes the signal, which is transferred from the processor 18 to the earpiece 5 via a D/A converter (not shown).

Basic Operation of the Predictive Text Editor.

Figure 3:
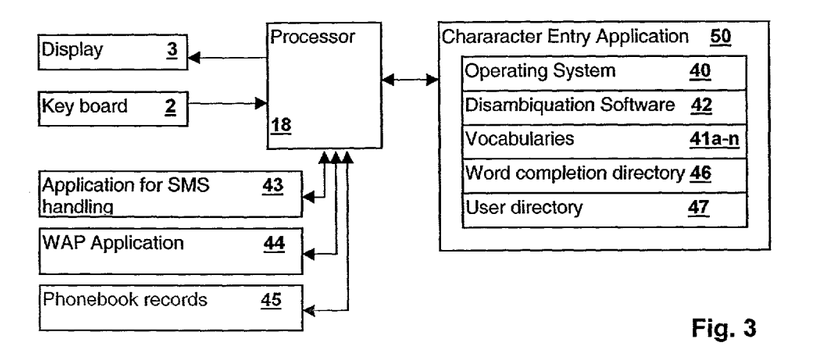
FIG. 3 shows the major components of the predictive text editor according to a preferred embodiment of the invention.

FIG. 3 shows the major components of the predictive text editor according to the invention. The display 3 and the keyboard 2 establish the man-machine interface. When user input is needed in application programs, such as an SMS message handling application 43, a WAP browser application 44, and for searching in phonebook records 45, the processor 18 opens a character entry application 50 in which the user may enter characters and use the entered character strings in the application from which the character entry application 50 is opened.

The processor 18 executes instructions and reads data from and writes data in the memory 17b. The character entry application 50 has software instructions in the memory 17b including an operating system 40, a disambiguation program 42 and its vocabularies 41a–n—one for each language supported by the editor, a user defined vocabulary 47 (e.g. words copied from the phonebook 45 and manually entered by multi-tapping), and a word completetion directory 46.

System Architecture

Figure 4:
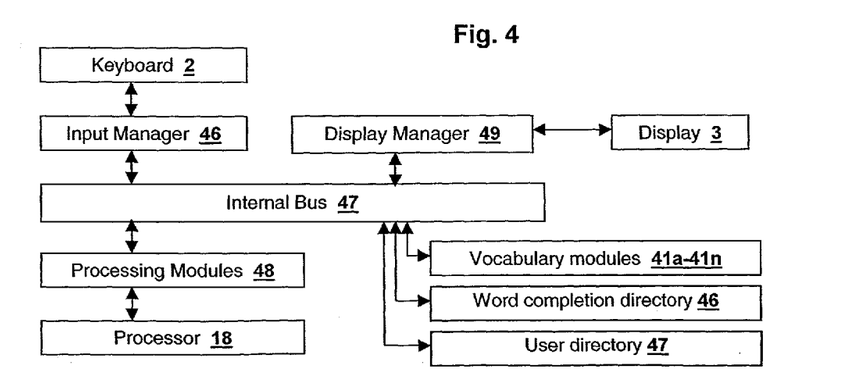
FIG. 4 shows the architecture of the ambiguity eliminating software according to a preferred embodiment of the invention.

FIG. 4 shows the architecture of the disambiguating software. Input from a keypad 2 is processed in an input manager 46. Input data is via internal bus means 47 passed to a processing module 48, which keeps a record of the current key sequence until the user has accepted a word based on this sequence by pressing the space key, e.g. being present by short pressing (shorter than e.g. 0.8 sec) the "0" key of alphanumeric keys. When a key stroke has been received by the processing module 47, the current key sequence is communicated via internal bus means 47 to a processor 18 (preferably being the same processor as the processor 18), which forwards the sequence to one or more modules 41a–n, 46 and 47 acting as electronic vocabularies. The predictive editor of the terminal only uses one out of a plurality of language dependent vocabularies 41a–n, and if the predictive editor is not in use, none of the language dependent vocabularies 41a–n will be used. However even in this case the word completion concept according to the invention may be used.

The vocabulary modules 41a–n, 46 and 47 work in parallel and respond individually if they contain data matching the current keystroke sequence. One vocabulary module 41a–n might include a dictionary containing words in a language, e.g. English, defined by the user and used as editing language. The vocabulary modules 41a–n, 46 and 47 often supply a plurality of matching words—either being displayed or available through a selection list.

The processor 18 accumulates a complete list of matching words and character strings for the selection list. When the processor 18 has finalised the processing, the processing module 47 transfers the selection list to a display manager 49 and the display 3 via the internal bus means 47.

In most cases, the disambiguation software will work as an editor server and therefore pass data strings directly to another client or application program 43, 44 running on the processor 18, too. In this case the keypad 2, the input processor 46 and the display manager 49 will be integrated in the application program 43, 44 using the predictive text editor as a server. These applications may include the electronic phone book memory, notepad, messages, calendar, and Internet browsing.

Table 1 shows a preferred key layout of the alphanumeric keys 7. When starting to type a word, the user simply presses the digit key containing the desired letter once.

TABLE 1

Layout of the alphanumeric keys 7.

| 1 | 55 | 2 abc | | 3 def |
|---|---|---|---|---|
| 4 ghi | | 5 jkl | | 6 mno |
| 7 pqrs | | 8 tuv | | 9 wxyz |
| * + | 56 | 0 ␣ | 57 | #⇑ |

If the user, with the predictive editor enabled, wants to type the word "case", he must press the following keys once "2/abc" to insert the "c", "2/abc" to insert the "a", "7/pqrs" to insert the "s", "3/def" to insert the "e", and finally the space key 57 in order to prepare for a new word. Special signs are available when pressing a "1"-key 55, and alternative matches are available in the predictive editor when pressing a "*/+"-56 key.

If the user, with the predictive editor disabled, wants to type the word "case" by means of multi-tapping, he must press the following keys "2/abc" three times to insert the "c", "2/abc" once to insert the "a", "7/pqrs" four times to insert the "s", "3/def" twice to insert the "e", and finally the space key 57 in order to prepare for a new word. Special signs are still available when pressing the "*/+" 56-key.

Word completion means the functionality of an input editor to automatically guess and suggest what word the user is typing; and doing it before the word is fully typed. Word completion is hence a very attractive feature for the current and future markets, where SMS sending is extremely hot especially among teenagers but also among many other users. And the speed and time used for typing text is a well-known and considerable limiting factor for especially small devices which do not have large alpha-numeric keyboards.

According to the preferred embodiment of the invention there is provided a dynamic dictionary built in into the mobile phone. This dictionary will reflect and contain the words that the user is using and hence become very "memory efficient". The dictionary/database will be built up/updated when the user is typing any new words using a predictive text editor, such as T9® or the old-fashioned multi-tab method. In this way, the 'word completion dictionary' will after some time automatically contain all the (long) words that the user is often typing. The phone will hence automatically add all the words that the user is typing to the "word-completion dictionary".

The dictionary should ideally only be adding "long" words, since these are the ones where word completion makes most sense (word completion is mainly ideal for typing long words). In a preferred embodiment of the invention, only. words larger than e.g. five characters would be saved to the word completion dictionary. Saving only long words will reduce the memory consumption of the word completion dictionary or it will leave more space for long words.

A suitable size of the word completion dictionary would be something like 100–1000 words. Experimental studies of the behavior of users of short messages services on GSM phones have shown that one hundred words would suit most users needs, due to the fairly limited amount of long words that a typical user is typing.

Assuming only long words (longer than five characters) to be stored (10–12 characters in average for some languages), this would require something like (100–1000) times (10–12) characters/bytes of memory, or something in the range 1–12 kilobytes. This is a considerably lower memory consumption than e.g. needed if a huge amount of words in several languages would need to be "pre-stored" from factory in the handset.

According to a preferred embodiment of the invention, the phone includes a compression program compressing the word completion dictionary; in order to reduce the memory consumption further.

While the user is typing, the phone will all the time check whether the word that the user is typing so far is contained in the word completion dictionary. If the word typed so far is found in the word completion dictionary, the phone will automatically suggest use of the word from the word completion dictionary, and allow the user to directly insert this entire long word. The user can always choose to continue the manual entry typing hereby making it easy to type other words than what the word completion dictionary contains.

It would probably be the best if the "word comparison" between words that the user is typing and words from the user dictionary first starts when the user has typed two or preferably three characters. Hereby avoiding too many situations where the user will get too many "wrong" suggestions to what the user is typing.

The auto-completion can work both when user is typing in editors supporting a predictive editor, such as e.g. T9® and in other editors, and probably even in Chinese and other input editors.

The individual key strokes may either designate individual characters (e.g. multi-tapping or qwerty input), or a group of characters (ambiguously). This string of key strokes reflects this fact.

Figure 5:
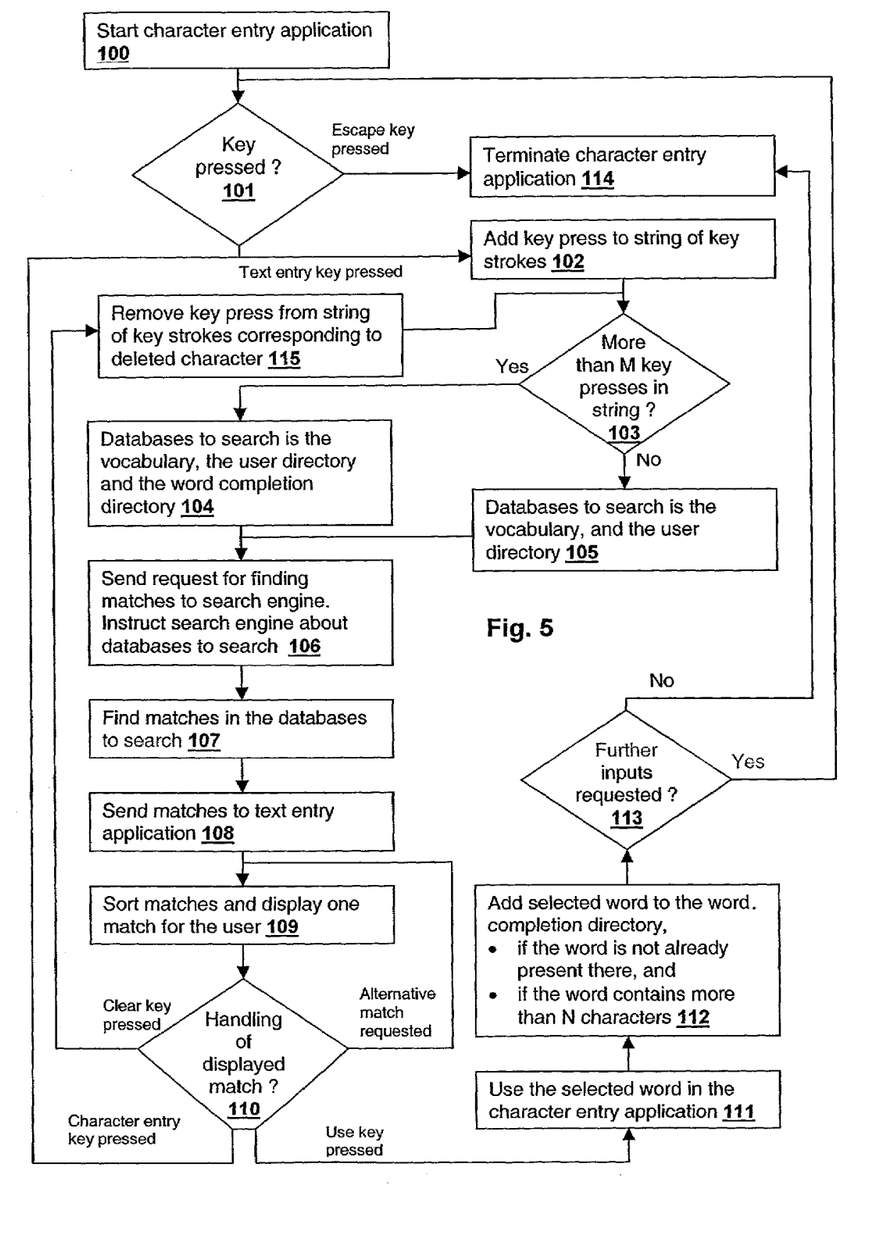
FIG. 5 shows a flow chart illustrating the steps performed in a preferred embodiment according to the invention.

The preferred embodiment of the invention will be described in the following with reference to FIG. 5. The character entry application is preferably common for several applications where text entry is needed. The user starts the character entry application in step 100 from for instance the message application. In step 101 the application is ready to received a key input, and when a character entry key has been pressed, the character entry application add the representation of the pressed key to a string of key strokes in step 102. If the escape key (the "right" soft-key 8) is pressed, the character entry application 50 is terminated at step 114.

In step 103 the character entry application determines the number key strokes In the string. If the number of key presses exceeds a threshold value, M, the character entry application defines in step 104 that matches should be searched in a standard directory of the predictive editor 40–42 in the language set by the user, the user directory 47 and the word completition directory 46. If the number of key presses is below the threshold value, M, the character entry application defines in step 105 that matches should be searched in a standard directory of the predictive editor 40–42 in the language set by the user and the user directory 47. The first predetermined number (threshold value, M) of key strokes is according to the preferred embodiment of the invention two.

When the character entry application 50 has determined which dictionaries to search, the character entry application in step 106 sends a request for finding matches to search engine 40,42 and identifies the dictionaries to be searched. The search engine 40,42 finds matches in step 107 and outputs the matches to the character entry application 50 in step 108. The character entry application 50 sorts the matches if there are more than one, and display one of the matches in step 109. The sorting may be so that match sources are prioritized and the individual matches from a source are sorted in e.g. alphabetic order, latest use, most frequently used, context in which is used.

When using a non-ambiguous editor, the character entry application 50 will always be able to suggest a word or a string of letters uniquely identified by the entered string of key strokes.

When using a predictive editor, the character entry application 50 will sometimes run out of matches, and will therefor not be able to display a match. Instead the character entry application 50 offers the user a non-ambiguish editor.

In step 110 the user is invited to operate on the suggested match. The user may request an alternative match, and the character entry application 50 will offer the user an alternative match in step 109. The user may press the "clear"-key (the right soft-key 8) in order to remove a key press from the string of key strokes corresponding to deleted character in step 115, or press a character entry key 7 in order to add this key press to the string of key strokes in step 102. In both these the character entry application 50 will start to investigate the updated string of key strokes in step 103.

If the user presses the "Use"-key (the left soft-key 8) the suggested match will be selected for use in the text entered by means of the character entry application 50 in step 111.

In step 112 the selected word is added to the word completion directory, if the word is not already present there, and if the selected word exceeds a second predetermined number of characters. The second predetermined number (threshold value, N) of key strokes is according to the preferred embodiment of the invention four.

If further inputs are requested in step 113, the character entry application 50 goes to step 101 and waits for key presses characterizing the following word. If no further input is requested in step 113, the character entry application 50 is terminated at step 114 and the entered text may be used in the application from which the character entry application 50 was opened.

Figure 6:
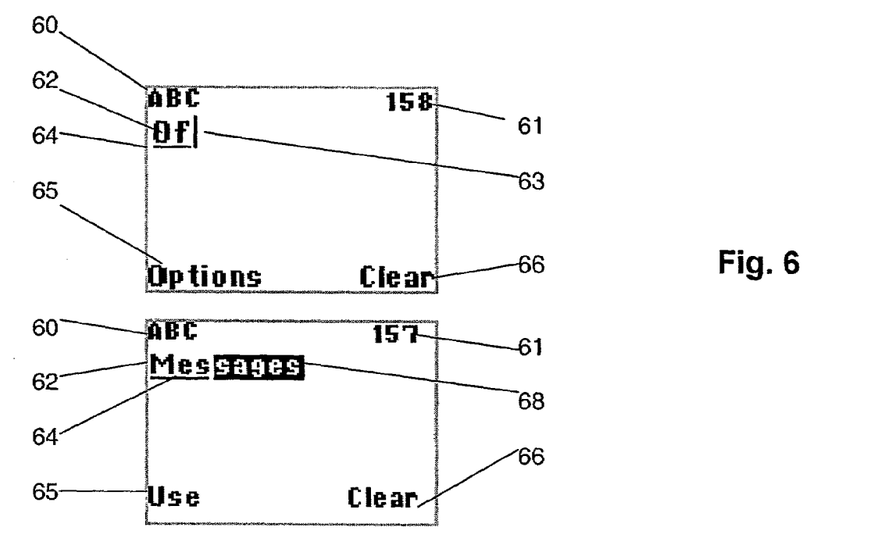
FIG. 6 shows a display sequence for providing word completion when entering a word according to a preferred embodiment of an editor according to the invention.

FIG. 6 shows an example of the design of the user interface for a text editor application when word completion is supported. Assuming that the user is in a text editor application, and the user has started typing the word "Message". In the described embodiment, the word completion is enabled when three or more characters has been entered for a word. In the first display of FIG. 6, the user has pressed only two keys—the "6/mno"-key and the "3/def"-key for typing the two characters "m" and "e". With use of an English vocabulary 41, the phone will suggest "of" as default matching word 62, while alternatives as "me", "nd", "ne", and "od" will be available when pressing the "*/+"- key 56. The default matching word 62 is underlined 64 indicating the the user is operating on this word 62, and a blinking bar 63 shows where the next character will be entered. An "ABC"-icon 60 indicates that the user presently is entering alphanumeric text, while a status icon 61 indicates that the text to be entered may use a further 158 characters for being used in the message application of the phone 1. The present functionality of the soft-keys 8 is "Options" and "Clear" as shown in two soft-key label fields 65, 66.

Now, the user presses the "7/pqrs"-key s' and we now assume that the word completion starts after 3 characters. In this example (second display) the word "Message" is already stored in the user dictionary (the word completion dictionary), and the phone will now propose the word "Messages" or another previously stored word matching the three pressed keys as default. The other matching words, as "mer", "mes", "ner", "nes", and "nep" will be available when pressing the "*/+"-key 56. The first three characters 67 are preferably shown as underlined characters 64 in order to indicate that three keys has been pressed. The rest 68 of the completed word may preferably be inverted as shown, in order to indicate that the entire word is not yet accepted. The present functionality of the soft-keys 8 is "use" and "Clear" as shown in two soft-key label fields 65, 66.

In this case, the user can do several things:

accept the suggested completed word by simply pressing the "Use" soft-key 8;

continue writing—the user may not have seen the proposed word or the user may be typing another word (e.g. "Messaging", "Mesh" or similar);

press the "Clear" soft-key 8 to erase the just the last typed character or by long pressing to clear the entire suggested word; or look for alternative completed words as "Messaging" by pressing the "*/+"-key 56.

In situations where the word completion dictionary contains several words, which match the string of key strokes the user has pressed so far, the phone may suggest:

the most frequently used word among the matches available (a "frequency of use" counter for providing statistical data needs to be present in the word completion dictionary);

the shortest (easy to set up rules); or the first found (easy to set up rules).

According to the prefered embodiment of the invention, the user is allowed to scroll between different matches available from the word completion dictionary, user dictionary and language specific vocabulary when this is selected by the user.

Overwriting when Memory is Full.

As mentioned above, basically all words that the user is typing will be added to the word completion dictionary 46. As also mentioned, it should be considered to only add words which exceed a certain amount of characters in length—preferably words longer than five characters—in order to optimise the use of memory.

At some stage, the dictionary will however get full. When this happens, the "oldest" (or least used, see below) word will be replaced from the dictionary.

According to a preferred embodiment of the invention all words in the word completion dictionary 46 will have a "frequency of use" counter, which will allow the following optimized end user experience:

The least used word will be the first word replaced with a "new" word typed by the user. This will ensure that the word completion dictionary 46 will always contain the "most used" words.

When the user is typing, and the word completion dictionary 46 contains several matches for the typed word, the "word completion" could always suggest the most frequently used word as default to the end user.

As an alternative, the handling could be as follows:

Whenever a word is "typed" (or "used" with auto-completion), it is placed in the "first" position in the word completion dictionary 46. In this way, the "oldest" (and probably least used) words will be replaced "first" from the dictionary.

When typing and several matches exist, the user will be presented with the "latest used" word from the word completion dictionary 46. This may in many cases be the "wanted" word.

With the above handling, the phone will first have to "learn" which words the user is "typically typing" after some time of use (the phone cannot suggest a word to "complete" as long as the word completetion directory is empty and until the user has typed the words manually at least once).

This handling may be sufficient, but may be improved:

by adding a mixture of typical words for an average user to the word completion dictionary 46 from the factory. The dictionary will hence be pre-filled with often used words from all the languages supported by the specific product variant. This will not require additional memory, since it will simply utilize the memory already allocated for the word completion dictionary 46. When the user starts to use the terminal the contents of the word completion dictionary 46 will change from standard words to personalized words; or by providing a large list of typically used words from the factory in all the languages supported by the phone. In this way the phone will be able to help the user to complete certain words when typing. However, this solution may be more complex and more memory consuming (since a word completion dictionary must exist for each supported language).

Sentence Completion

The entire word completion feature is based on the fact that a certain user will often write the same words over and over again. However, a further potential improvement of the feature would be to also allow sentences to be completed. The handling is very similar to the above, but we could also store entire sentences in the word completion dictionary. If the user then starts to write a sentence which is already typed before, we could suggest the user to complete the entire sentence.

Sentence completion would mainly be useful for users who very often write the exact same sentences, like "I Love You", or "I am in a meeting". A further addition to the sentence completion could be that all precanned "Templates" from the SMS application would automatically be part of this. In this way the user can easily insert an entire template by simply writing the start of the sentence/template. The entire sentence completion text would be shown with the letters matching the input underlined and with the rest inverted. By pressing the "Use" soft-key 8 once the first word in the sentence will be used, while the remaining words in the sentence will remain offered for use to the user and still be inverted. These words may be selected one by one by multiple pressing of the "Use" soft-key 8, or all at once by a single long press (more than 0.8 seconds) of the "Use" soft-key 8.

The sentence completion does not neccasarily have to require a lot of memory, if the sentences to offer completed is coming from the user dictionary 47 and originates from the folders, such as the inbox and outbox of the messages stored by the application for SMS handling 43.

The main advantages of the proposed concept is as follows (compared to a known word completion concepts):

- The concept may require far less memory consumption compared to integrating built-in full dictionaries for all supported languages.
- The concept will allow optimised word completion for the individual user;
- the phone will not suggest a huge amount of words which the user may never type—it will always suggest words that the user has already used/typed.

An alternative embodiment of the invention will be described in the following with reference to FIGS. 7 and 8. This embodiment is similar to the embodiment described with reference to FIG. 5, but offer sentence completetion, too. The user starts the character entry application in step 200 from for instance the message application. In step 201 the application is ready to receive a key input, and when a character entry key has been pressed, the character entry application adds the representation of the pressed key to a string of key strokes in step 202. If the escape key (the "right" soft-key 8) is pressed, the character entry application 50 is terminated at step 210.

In step 203 the character entry application determines the number of key strokes In the string. The character entry application defines that matches should be searched in some or all available directories, as the standard directory of the predictive text editor 40–42 in the language set by the user, the user directory 47 and the word completition directory 46.

When the character entry application 50 has determined which dictionaries to search, the character entry application sends a request for finding matches to search engine 40,42 and identifies the dictionaries to be searched. The search engine 40,42 finds matches in step 204. The character entry application 50 sorts the matches if there are more than one, and display one of the matches in step 205. The user may request an alternative match, and the character entry application 50 will offer the user an altenative match.

In step 206 the user is invited to operate on the suggested match. The user may press the "clear"-key (the right soft-key 8) or a character entry key 7 in order to update the string of key strokes in step 202.

Figure 7:
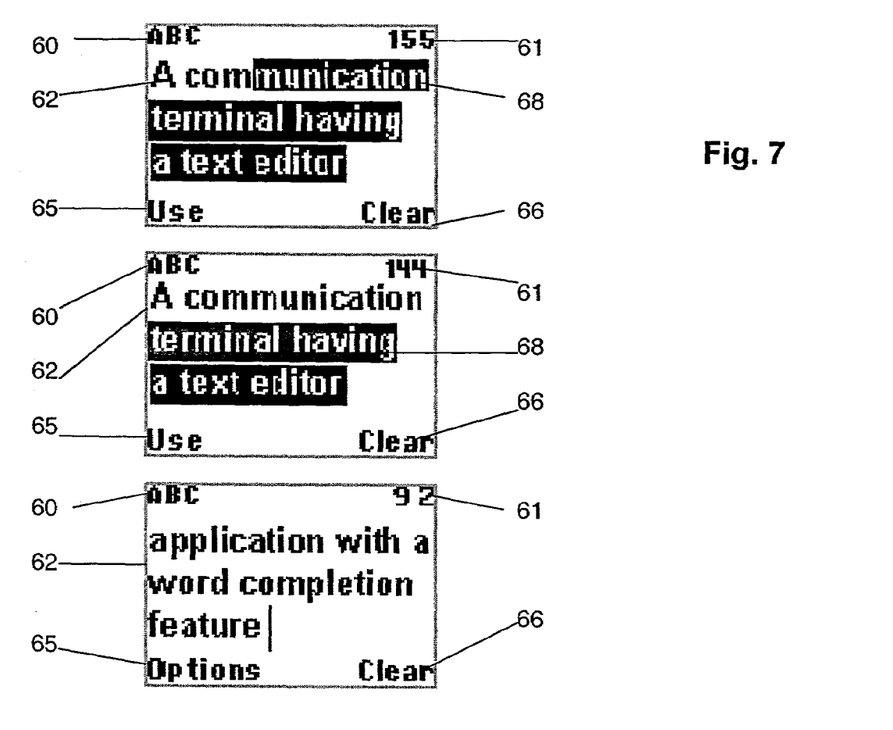
FIG. 7 shows a display sequence for providing full or partial sentence completion when entering words according to a second embodiment of an editor according to the invention.
Figure 8:
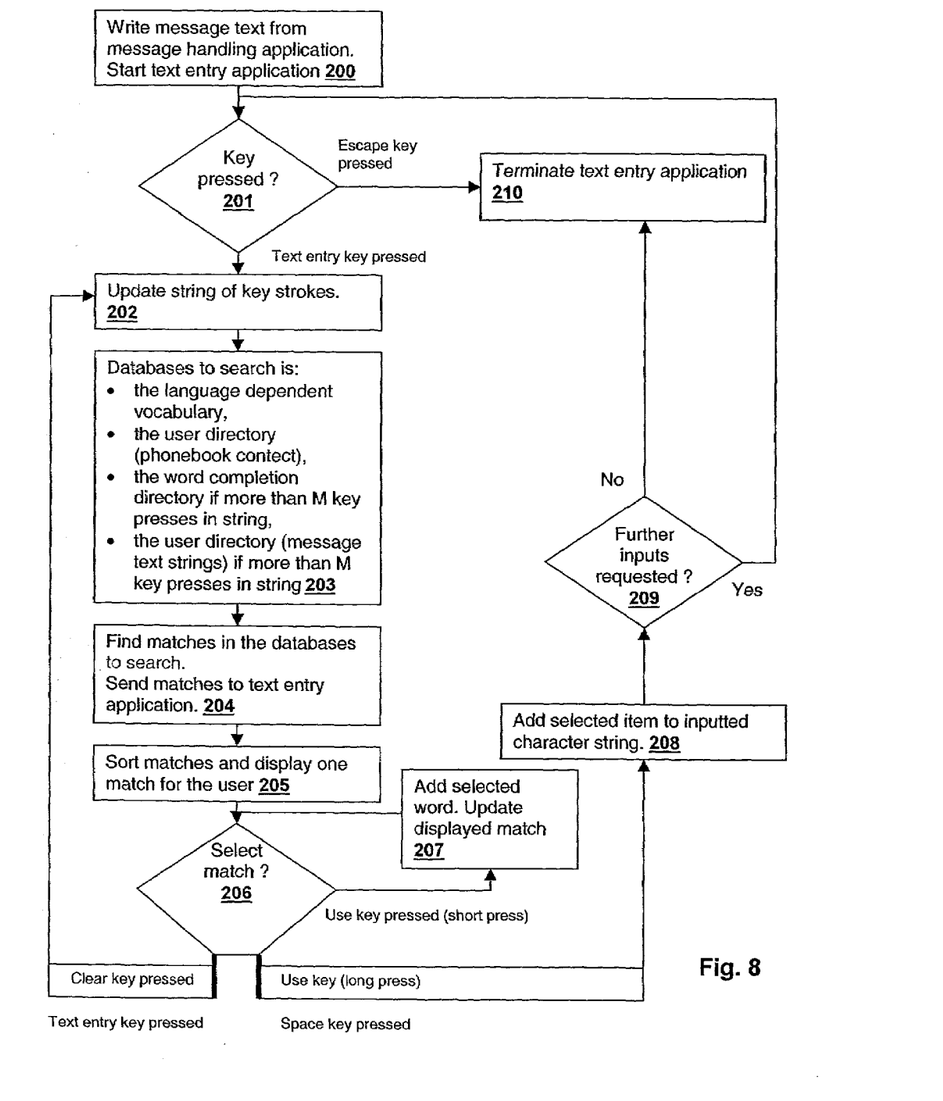
FIG. 8 shows a flow chart illustrating the steps performed in the second embodiment according to the invention.

FIG. 8 shows an example of the design of the user interface for a text editor application when sentence completion is supported. Assuming that the user is in a text editor application, and the user has started typing the sentence "A communication terminal having a text editor application with a word completion feature" by means of a predictive editor. In the described embodiment, the user has entered five characters in the overall text string, and then the character entry application 50 suggests an entire message text (SMS) as shown in the first display of FIG. 7, when such a sentence matches the entered key strokes. This is done when more than a third number of key strokes, preferably four, have been entered for the entire text string.

In the first display of FIG. 7, the user has pressed only five keys—the "2/abc"-key, the "0/space"-key, the "2/abc"-key and the "6/mno"-key, twice, for typing the characters "A com". A text string including several matches is identified as a possible match. The number of characters corresponding to the number of key stroke is shown as normal text 62, while the rest of the suggested match is shown inverted 68. An "ABC"-icon 60 indicates that the user presently is entering alphanumeric text, while a status icon 61 indicates that the text to be entered may use further 155 characters for being used in the message application of the phone 1. The present functionality of the soft-keys 8 is "Use" and "Clear" as shown in two soft-key label fields 65, 66.

Now, the user may short press (less than 0.8 seconds) the "Use" soft-key 8, and then select the first word (communication) in the invented text string. The character entry application 50 then up-dates the display in step 207 as shown in the second display of FIG. 7. The rest of the sentence is shown inverted 68. By multiple short presses of the "Use" soft-key 8, the user may select the entire suggested match word for word, or just choose the words to be used.

Alternatively the user may long press (more than 0.8 seconds) the "use" soft-key 8, and then select the the entire sentence shown as the inverted text string as shown in the third display of FIG. 7.

If the user long presses the "Use"-key (the left soft-key 8), this selects only the suggested word shown inverted or the space key the suggested match will be selected for use in the text entered by means of the character entry application 50 in step 208, and the selected word is added to the word completion directory, if the word is not already present there, and if the word selected exceeds a second predetermined number of characters.

If further inputs are requested in step 209, the character entry application 50 goes to step 201 and waits for key presses characterising the following word. If no further input is requested, the character entry application 50 is terminated at step 210 and the entered text may be used in the application from which the character entry application 50 was opened.

Word Completion Based on Contextual Information

This aspect of the invention may be used with multi-tapping editor where the characters are entered in a non-ambiguous way and in a predictive text editor, where the editor suggests character strings matching a string of key strokes each ambiguously representing a plurality of key strokes. The number of word completion candidates is smaller in a multi-tapping editor than in a predictive text editor.

When the user is typing a text, for example an email message on a mobile device, the device will preferably suggest one matching word, and he can through specific interaction (e.g. a button press) call up the remaining words in a word completion list. The word completion list consists of all words that begin with the same sequence of keystrokes as the user has already typed in. For example, if the user has typed "Univ", the word completion list includes words like "University", "Universe" and "Universal". In order to minimise the number of key presses; the system should propose the word list in the most probable order of appearance.

According to this aspect of the invention, the word list is formed through understanding the context of the message. In addition, in this invention the list can contain nominal phrases in addition to single words. For example, if the user has typed "Use", a possible prediction could be "user interface".

The context of the message can be derived from several sources. The most important ones are the following:

1. The text typed so far. It is likely that the user uses words and the nominal phrases that appear in the text that user has already typed in the same message.

2. The message that has been replied upon. If the user is writing a reply to a received message it is very likely that he uses the same words and nominal phrases that appear in the original text. For example, if the original message contains the phrase "movie tickets", that could be used as a word completion proposal in the reply message.
3. All text in received and sent text messages. As text-messaging uses only limited language, it is probable that the language is slightly different to the standard language. In addition, text messaging is used for specific purposes only. This indicates that received and sent text messages is a very good source for the context information.
4. A specifically specified context. The context information could also be predefined, for example as a network service. If it turns out that the users use a specific language, the context, mostly used words and phrases, could be retrieved as an existing database. In this case, even when writing the first message in the terminal, a good phrase database would be available. This is a very likely scenario in horizontal markets, for example in a terminal for medical or legal use.
5. Contact databases (e.g. phone book in phone memory). A combination of a capitalised letter and lowercase letter would cause the system to find a matching word from the contact database, which contains names.
6. Communication history. When the recipient of message is defined prior to typing, all messages (or a database of the vocabulary used in them) to and from this particular recipient can be used as the context. This feature is based on the observation that the text written to business contacts is different to family members and friends.

During writing the text, the input system (whether predictive or disambiguate) monitors all the available sources for the context information. When a word completion fits the text being typed, it is either displayed to the user, inserted readily to the text or added to a list of candidate words that can be displayed or inserted.

What is claimed is:

1. A method of handling the input of words into a text string in a communication terminal, comprising steps of:
   recording a key stroke sequence inputted for characterizing one of said words;
   comparing said key stroke sequence with candidates in a word completion directory in order to find word completion candidates matching said key stroke sequence;
   displaying one of said matching word completion candidates in a display for selection by the user; and
   adding a word selected by the user to said directory including a plurality of word completion candidates, if the selected word exceeds a first predetermined number of characters, and if this word is not present there already,
      wherein the user, when the candidate comprises a text string consisting of a plurality of individual words, selects the first candidate word in the text string by pressing a select-key for a period shorter than a predetermined period of time, and selects the entire text string by pressing the select-key for a period longer than the predetermined period of time.

2. A method according to claim 1, wherein the candidates in the word completion directory comprise a plurality of text strings each consisting of a plurality of individual words and are derived from text messages stored in the communication terminal.

3. A method according to claim 2, wherein the user, when the candidate comprises a text string consisting of a plurality of individual words, selects the candidate word by word.

4. A method according to claim 2, wherein the user, when the candidate comprises a text string consisting of a plurality of individual words, selects all the words in the text string of the candidate.

5. A method according to claim 1, wherein the word completion candidates in the word completion directory are searched for matches when the number of key strokes inputted exceeds a second predetermined number of key strokes.

6. A method according to claim 5, wherein the second predetermined number of keystrokes is four.

7. A method according to claim 1, wherein the first predetermined number of keystrokes is two.

8. A method according to claim 2, wherein the plurality of text strings each consisting of a plurality of words is searched when a third number of key strokes has been inputted.

9. A method according to claim 8, wherein the third predetermined number of keystrokes is four.

10. A method according to claim 1, wherein the word completion directory contains words being entered by the user by means of a text editor during a plurality of different sessions.

11. A method according to claim 10, wherein the word completion directory contains words being entered by the user in a previously terminated message writing session.

12. A method according to any of the claims 1–11, wherein the key stroke sequence is inputted to a predictive search engine outputting matches matching an ambiguous string of key strokes.

13. A character entry application for use in a communication terminal for entering a text string for use in text applications, and comprising:
   text entry keys for entering a key stroke sequence inputted for characterizing a character string;
   a word completion directory;
   means for recording the inputted key stroke sequence;
   means for comparing the inputted key stroke sequence with candidates in the word completion directory in order to find word completion candidates matching the inputted key stroke sequence;
   a display for displaying one of said matching word completion candidates;
   means for selecting the displayed one of said matching word completion candidates;
   means for adding a selected word to said directory including a plurality of word completion candidates, if the selected word exceeds a first predetermined number of characters, and if this word is not present there already; and
   a select key means,
      wherein the user, when the candidate comprises a text string consisting of a plurality of individual words, selects the first candidate word in the text string by pressing a select-key for a period shorter than a predetermined period of time, and selects the entire text string by pressing the select-key for a period longer than the predetermined period of time.

14. A character entry application according to claim 13, and furthermore comprising a predictive search engine to which the recorded key strokes sequence is inputted, and wherefrom matches matching an ambiguous string of key strokes is outputted in response to the inputted recorded key strokes sequence.

15. A character entry application according to claim 13, wherein the character entry application provides matches matching a string of non-ambiguous keystrokes inputted as the recorded keystrokes sequence.

16. A character entry application according to claim 13, wherein the candidates in the word completion directory comprise a plurality of text strings each consisting of a plurality of individual words and derived from text messages stored in the communication terminal.

17. A character entry application according to claim 16, further comprising selection means by which the user selects the candidate word by word, when the candidate comprises a text string consisting of a plurality of individual words.

18. A character entry application according to claim 16, further comprising selection means by which the user selects all the words in the text string of the candidate, when the candidate comprises a text string consisting of a plurality of individual words.

19. A character entry application according to claim 13, wherein the word completion candidates in the word completion directory are searched for matches, when the number of key strokes inputted exceeds a second predetermined number of key strokes.

20. A character entry application according to claim 19, wherein the second predetermined number of keystrokes is four.

21. A character entry application according to claim 13, wherein the first predetermined number of keystrokes is two.

22. A character entry application according to claim 16, wherein the plurality of text strings each consisting of a plurality of words is searched when a third number of key strokes has been inputted.

23. A character entry application according to claim 22, wherein the third predetermined number of keystrokes is four.

24. A character entry application according to claim 13, wherein the word completion directory contains words that are entered by the user by means of a text editor during a plurality of different sessions.

25. A character entry application according to claim 24, wherein the word completion directory contains words being entered by the user in a previously terminated message writing session.

26. A communication terminal for entering a text string for use in text applications, comprising:
    text entry keys for entering a key stroke sequence inputted for characterizing a character string; a word completion directory;
    means for recording the inputted key stroke sequence;
    means for comparing the inputted key stroke sequence with candidates in the word completion directory in order to find word completion candidates matching the inputted key stroke sequence;
    means for displaying one of said matching word completion candidates;
    means for selecting the displayed one of said matching word completion candidates;
    means for adding a selected word to said directory including a plurality of word completion candidates, if the selected word exceeds a first predetermined number of characters, and if this word is not present there already; and
    a select key means,
    wherein the user, when the candidate comprises a text string consisting of a plurality of individual words, selects the first candidate word in the text string by pressing a select-key for a period shorter than a predetermined period of time, and selects the entire text string by pressing the select-key for a period longer than the predetermined period of time.

27. A communication terminal according to claim 26, and furthermore comprising a predictive search engine to which the recorded key strokes sequence is inputted, and wherefrom matches matching an ambiguous string of key strokes is outputted in response to the inputted recorded key strokes sequence.

28. A communication terminal according to claim 26, wherein the character entry application provides matches matching a string of non-ambiguous keystrokes inputted as the recorded keystrokes sequence.

29. A communication terminal according to claim 26, wherein the candidates in the word completion directory comprise a plurality of text strings each consisting of a plurality of individual words and derived from text messages stored in the communication terminal.

30. A communication terminal according to claim 29, further comprising selection means by which the user selects the candidate word by word, when the candidate comprises a text string consists of a plurality of individual words.

31. A communication terminal according to claim 29, further comprising selection means by which the user selects all the words in the text string of the candidate, when the candidate comprises a text string consists of a plurality of individual words.

32. A communication terminal according to claim 26, wherein the word completion candidates in the word completion directory are searched for matches, when the number of key strokes inputted exceeds a second predetermined number of key strokes.

33. A communication terminal according to claim 32, wherein the second predetermined number of keystrokes is four.

34. A communication terminal according to claim 26, wherein the first predetermined number of keystrokes is two.

35. A communication terminal according to claim 29, wherein the plurality of text strings each consisting of a plurality of words is searched when a third number of key strokes has been inputted.

36. A communication terminal according to claim 35, wherein the third predetermined number of keystrokes is four.

37. A communication terminal according to claim 26, wherein the word completion directory contains words being entered by the user by means of a text editor during a plurality of different sessions.

38. A communication terminal according to claim 37, wherein the word completion directory contains words being entered by the user in a previously terminated message writing session.

39. A method of handling input of words into an input text string displayed on a communication terminal, comprising steps of:
    receiving a character sequence inputted by a user;
    adding the character sequence to the input text string displayed on the communication terminal;
    comparing said character sequence with candidates in a word completion directory in order to find word completion candidates matching said character sequence, wherein at least one of the word completion candidates comprises a multi-word text string;

displaying a matching multi-word completion candidate for selection by the user; and in response to a user selection of the matching multi-word completion candidate, adding text from the multi-word completion candidate selected by the user to said input text string displayed on the communication terminal, wherein if the user selects the matching multi-word completion candidate by pressing a select key for a period shorter than a predetermined period of time, then only the first word in the multi-word completion candidate is added to the input text string displayed on the communication terminal, and wherein if the user selects the matching multi-word completion candidate by pressing the select key for a period longer than a predetermined period of time, then the entire multi-word completion candidate is added to the input text string displayed on the communication terminal.

40. One or more computer readable media storing computer-executable instructions which, when executed on a computer system, perform a method comprising:

receiving a character sequence inputted by a user;

adding the character sequence to the input text string displayed on the communication terminal;

comparing said character sequence with candidates in a word completion directory in order to find word completion candidates matching said character sequence, wherein at least one of the word completion candidates comprises a multi-word text string;

displaying a matching multi-word completion candidate for selection by the user; and in response to a user selection of the matching multi-word completion candidate, adding text from the multi-word completion candidate selected by the user to said input text string displayed on the communication terminal, wherein if the user selects the matching multi-word completion candidate by pressing a select key for a period shorter than a predetermined period of time, then only the first word in the multi-word completion candidate is added to the input text string displayed on the communication terminal, and wherein if the user selects the matching multi-word completion candidate by pressing the select key for a period longer than a predetermined period of time, then the entire multi-word completion candidate is added to the input text string displayed on the communication terminal.

41. A mobile communication terminal, comprising:

a display;

an input comprising one or more character keys and a select key;

a processor, and a memory having stored thereon machine-executable instructions which, when executed by the processor, cause the mobile terminal to perform steps comprising, receiving a character sequence inputted by a user with the one or more character keys;

adding the character sequence to an input text string displayed on the display of the mobile terminal;

comparing said character sequence with candidates in a word completion directory in order to find word completion candidates matching said character sequence, wherein at least one of the word completion candidates comprises a multi-word text string;

displaying a matching multi-word completion candidate for selection by the user; and in response to a user selection of the matching multi-word completion candidate, adding text from the multi-word completion candidate selected by the user to said input text string displayed on the mobile terminal, wherein if the user selects the matching multi-word completion candidate by pressing the select key for a period shorter than a predetermined period of time, then only the first word in the multi-word completion candidate is added to the input text string on the display of the mobile terminal, and wherein if the user selects the matching multi-word completion candidate by pressing the select-key for a period longer than a predetermined period of time, then the entire multi-word completion candidate is added to the input text string on the display of the mobile terminal.

* * * * *